US010790978B2

(12) United States Patent
Smith et al.

(10) Patent No.: US 10,790,978 B2
(45) Date of Patent: Sep. 29, 2020

(54) TECHNOLOGIES FOR COLLECTIVE AUTHORIZATION WITH HIERARCHICAL GROUP KEYS

(71) Applicant: Intel Corporation, Santa Clara, CA (US)

(72) Inventors: Ned M. Smith, Beaverton, OR (US); Omer Ben-Shalom, Rishon le-Tzion (IL); Alex Nayshtut, Gan Yavne (IL)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 15/271,566

(22) Filed: Sep. 21, 2016

(65) Prior Publication Data
US 2017/0346640 A1    Nov. 30, 2017

Related U.S. Application Data

(60) Provisional application No. 62/341,408, filed on May 25, 2016.

(51) Int. Cl.
| | |
|---|---|
| *H04L 9/32* | (2006.01) |
| *H04L 9/14* | (2006.01) |
| *H04L 9/08* | (2006.01) |

(52) U.S. Cl.
CPC ............. *H04L 9/14* (2013.01); *H04L 9/0822* (2013.01); *H04L 9/0825* (2013.01); *H04L 9/0836* (2013.01); *H04L 9/3247* (2013.01)

(58) Field of Classification Search
CPC ....... H04L 9/14; H04L 9/0822; H04L 9/0825; H04L 9/0836; H04L 9/3247
See application file for complete search history.

(56) References Cited

U.S. PATENT DOCUMENTS

| | | | | |
|---|---|---|---|---|
| 6,816,966 B1 * | 11/2004 | Gupta | ..................... | H04L 12/18 713/163 |
| 7,103,771 B2 * | 9/2006 | Grawrock | ............... | G06F 21/57 713/155 |

(Continued)

OTHER PUBLICATIONS

NPL Search (Google Scholar) (Year: 2020).*
NPL Search (InnovationQ) (Year: 2020).*

*Primary Examiner* — Mahfuzur Rahman
*Assistant Examiner* — Richard W Cruz-Franqui
(74) *Attorney, Agent, or Firm* — Barnes & Thornburg LLP

(57) ABSTRACT

Technologies for secure collective authorization include multiple computing devices in communication over a network. A computing device may perform a join protocol with a group leader to receive a group private key that is associated with an interface implemented by the computing device. The interface may be an instance of an object model implemented by the computing device or membership of the computing device in a subsystem. The computing device receives a request for attestation to the interface, selects the group private key for the interface, and sends an attestation in response to the request. Another computing device may receive the attestation and verify the attestation with a group public key corresponding to the group private key. The group private key may be an enhanced privacy identifier (EPID) private key, and the group public key may be an EPID public key. Other embodiments are described and claimed.

19 Claims, 7 Drawing Sheets

(56) References Cited

U.S. PATENT DOCUMENTS

| | | | | |
|---|---|---|---|---|
| 8,782,401 B2* | 7/2014 | Sarangdhar | H04L 9/3234 | 380/277 |
| 2005/0044356 A1* | 2/2005 | Srivastava | H04L 63/0281 | 713/163 |
| 2005/0086481 A1* | 4/2005 | Winget | H04L 63/123 | 713/176 |
| 2007/0260879 A1* | 11/2007 | Dzung | H04L 63/104 | 713/163 |
| 2008/0270786 A1* | 10/2008 | Brickell | H04L 9/3073 | 713/155 |
| 2009/0006862 A1* | 1/2009 | Alkove | G06F 21/121 | 713/189 |
| 2009/0323962 A1* | 12/2009 | Aciicmez | H04L 12/1859 | 380/277 |
| 2013/0305364 A1* | 11/2013 | Haikney | G06F 9/46 | 726/22 |
| 2014/0006776 A1* | 1/2014 | Scott-Nash | G06F 21/57 | 713/156 |
| 2014/0089660 A1* | 3/2014 | Sarangshar | H04L 9/321 | 713/156 |
| 2014/0115659 A1* | 4/2014 | Attfield | H04L 63/20 | 726/1 |
| 2014/0173281 A1* | 6/2014 | Hwang | H04L 9/3255 | 713/171 |
| 2014/0205090 A1* | 7/2014 | Li | H04L 9/3252 | 380/44 |
| 2015/0013002 A1* | 1/2015 | Smith | G06F 21/44 | 726/17 |
| 2015/0082024 A1* | 3/2015 | Smith | H04L 67/1095 | 713/155 |
| 2016/0182518 A1* | 6/2016 | Smith | H04L 63/0272 | 726/3 |
| 2016/0234682 A1* | 8/2016 | Mandyam | H04W 12/04 | |
| 2016/0241403 A1* | 8/2016 | Lindemann | G06F 21/34 | |
| 2016/0295413 A1* | 10/2016 | Liu | H04W 12/003 | |
| 2016/0366185 A1* | 12/2016 | Lee | H04L 9/3236 | |
| 2016/0373257 A1* | 12/2016 | Adrangi | H04W 12/0013 | |
| 2017/0054562 A1* | 2/2017 | Cooper | H04L 63/062 | |
| 2017/0161505 A1* | 6/2017 | Campagna | G06F 21/57 | |
| 2017/0288876 A1* | 10/2017 | Dragone | H04L 63/12 | |
| 2017/0346640 A1* | 11/2017 | Smith | H04L 9/0822 | |
| 2018/0212971 A1* | 7/2018 | Costa | G06F 21/602 | |
| 2018/0234255 A1* | 8/2018 | Fu | H04L 9/14 | |
| 2019/0149539 A1* | 5/2019 | Scruby | G06F 21/335 | 71/168 |
| 2019/0268284 A1* | 8/2019 | Karame | H04L 47/828 | |

* cited by examiner

TECHNOLOGIES FOR COLLECTIVE AUTHORIZATION WITH HIERARCHICAL GROUP KEYS

CROSS-REFERENCE TO RELATED APPLICATION

The present application claims priority under 35 U.S.C. § 119(e) to U.S. Provisional Patent Application Ser. No. 62/341,408, entitled "TECHNOLOGIES FOR COLLECTIVE AUTHORIZATION WITH HIERARCHICAL GROUP KEYS," which was filed on May 25, 2016.

BACKGROUND

Today, most products that are made of a collection of subsystems (such as networks of computers, smart transportation systems, smart buildings, etc.) may have discrete components that can attest, but these attestations may not guarantee the integrity of the subsystems, only the discrete component. Typically, attestation keys are statically assigned to discrete components and thus only represent trust of that component, and not system-level trust. However, subsystems are often composed dynamically in the supply chain and later at deployment time. For example, for Internet of Things (IoT) based subsystems, more than 80% of the system complexity may be realized at deployment (long after manufacturers and ODMs have shipped their discrete components). Additionally, many components may be shipped without the means for attesting. Individual component attestations may be validated separately by potentially different validating entities and individually checked with the appropriate authority and/or registrar. In order to make system-level trust assertions, validation keys may need to be replicated and distributed and stored using volatile environments that introduce both risk and complexity.

Such complexity may be multiplied in complex IoT, enterprise, and social applications that may include many subsystems (e.g., sub-parts, sub-domains, etc.) that may be further decomposed into yet smaller subsystems. In IoT ecosystems especially, the system may be constructed by the customer or system integrator. For current IoT frameworks, device attestation focuses on establishing a unique identifier in one sub-component and authenticating that sub-component, assuming that the sub-component represents a larger system. The system may substitute the attestable sub-component, but the trust assertion is always the same.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
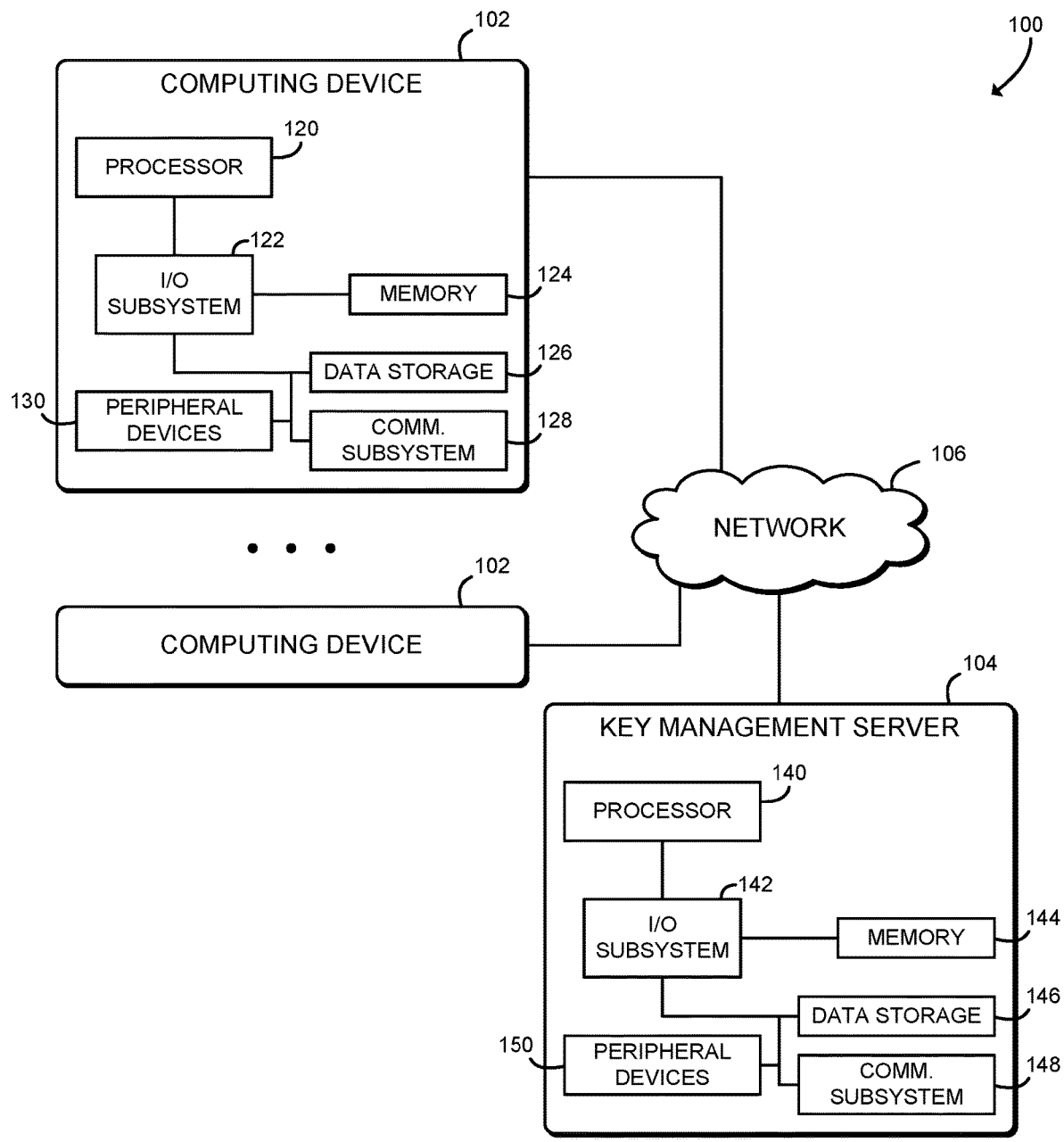
FIG. 1 is a simplified block diagram of at least one embodiment of a system for collective authorization with hierarchical group keys.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for collective authorization with hierarchical group keys includes multiple computing devices 102 in communication over a network 106. In some embodiments, the system 100 may also include a key management server 104. In use, as described further below, each of the computing devices 102 may be provisioned with one or more group private keys corresponding to interfaces implemented by the computing device 102. Each interface represents behavior of the computing device 102 at a particular hierarchical level in a composite product made of multiple computing devices 102 and/or subsystems. For example, each interface may be an object model interface or membership in a particular subsystem. Each subsystem may be further composed of multiple computing devices 102 and/or subsystems. A computing device 102 may receive a request for attestation to a particular interface and respond with an attestation based on the associated group private key. The verifying entity (e.g., another computing device 102 in the same subsystem or in a super-system) uses a corresponding group public key to verify the attestation. The computing devices 102 may be provisioned by a group leader, such as the key management server 104 or another computing device 102. The group leader may be provided, for example, by a manufacturer during manufacture of the computing device 102 or by a system integrator during integration of a subsystem. The group private keys provisioned to a computing device 102 may thus form a trust tree including all of the subsystems that include the computing device 102. A validation of a top-level product and/or system may only require a single group public key or certificate. A top-level verifier may trust that the various subsystems and computing devices 102 were verified during subsystem construction. The group private keys are elements of the subsystem interface definition, and therefore the group private key can securely assert its interface semantics as part of subsystem introspection. Recursive application of introspection may result in re-check of all the attestations of all the subsystems in the hierarchy. Thus, trust may be proven using attestation according to a group private key that best represents the layer of system abstraction that is most appropriate.

Accordingly, the system 100 may provide a multiple-level trust hierarchy where each entity has only one attestation (group private) key and one validation (group public key) certificate, which may both be physically implemented (e.g., hardened) into the computing device 102. These credentials may provide upstream attestation and downstream validation. Additionally, having a complete sub-tree use the same group public key certificate may facilitate autonomous verification by each manufacturer of each subsystem. The system 100 may thus create a simple trust scheme in which each subsystem can validate all nodes (e.g., subsystems and/or computing devices 102) directly below it using recursive attestation of the intended object interaction.

Additionally, the system 100 may allow a complete organism or collective to have each sub-component attest to the upstream node. Thus, the system 100 may make replacement of a component with another component having equivalent functionality easy, and may make replacement of a component with another component having different functionality difficult. The unique identity of the replaced part may not be relevant to the product and/or subsystem composition. For example, an airplane manufacturer may use engines, video systems, navigation systems, and other systems by providing each manufacturer with a group key to be used to prove that the component (e.g. a computing device 102 and/or subsystem including multiple computing devices 102) is allowed to live in the collective product (e.g., an airplane). A sub-manufacturer such as the engine manufacturer may similarly use its own group key set to allow each engine sub-component (e.g. each engine computing device 102 or engine subsystem) to validate with the engine entity, and so on. Eventually, the complete airplane from the smallest live component to the master computers is trusted, since each component was autonomously validated by its direct "owner," creating a complete "chain of trust" from that entity up to the master computers. The airplane is therefore fully validated and attested without requiring a registrar to assign separate keys to sub-entities.

The system 100 may further improve scalability by reducing the number of keys used in a complete collective product, as compared to using device identity keys for attestation. In particular, the total number of keys used in the complete product may be reduced to under two times the total number of levels of the hierarchical subsystem tree, which may be especially important if the ratio of nodes to sub-nodes is high. As described above, the system 100 may improve autonomy by allowing each manufacturer of a subsystem to handle its own trust chain and provide upstream attestation of the completed entity (e.g., computing device 102, subsystem, or other collective product). Additionally, the system 100 may operate without a registrar and thus may remove a potential attack surface that could be compromised. The system 100 may allow continuous validation of each message in a subsystem since the cost of validation may be reduced due to the locality of the validation material. Further, having no dependency on communications beyond the immediate entity and direct sub-entity, may reduce the number of potential failure points in the system 100 (e.g., by avoiding communication breakdowns, registrar corruption, and other failures).

Each computing device 102 may be embodied as any type of computation or computer device capable of performing the functions described herein, including, without limitation, an embedded computing device, a sensor, a manufactured part, a manufactured assembly, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 120, an input/output subsystem 122, a memory 124, a data storage device 126, and a communication subsystem 128. Of course, the computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 102 may also include one or more peripheral devices 130. The peripheral devices 130 may include any number of additional input/output devices, interface devices, sensors, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

The key management server 104 may be embodied as any type of computation or computer device capable of performing the functions described herein, including, without limitation, a computer, a multiprocessor system, a server, a rack-mounted server, a blade server, a network appliance, a distributed computing system, a processor-based system, and/or a consumer electronic device. As such, the key management server 104 may be embodied as a single server computing device or a collection of servers and associated devices. For example, in some embodiments, the key management server 104 may be embodied as a "virtual server" formed from multiple computing devices distributed across the network 106 and operating in a public or private cloud. Accordingly, although the key management server 104 is illustrated in FIG. 1 and described below as embodied as a single server computing device, it should be appreciated that the key management server 104 may be embodied as multiple devices cooperating together to facilitate the functionality described below. The key management server 104 may include a processor 140, an I/O subsystem 142, a memory 144, a data storage device 146, a communication subsystem 148, peripheral devices 150, and/or other components and devices commonly found in a server or similar computing device. Those individual components of the key management server 104 may be similar to the corresponding components of the computing device 102, the description of which is applicable to the corresponding components of the key management server 104 and is not repeated herein so as not to obscure the present disclosure.

As discussed in more detail below, the computing devices 102 and the key management server 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a controller-area network, a cellular network, and/or a publicly-accessible, global network such as the Internet. As such, the network 106 may include any number of additional devices, such as additional computers, routers, and switches, to facilitate communications among the devices of the system 100.

Figure 2:
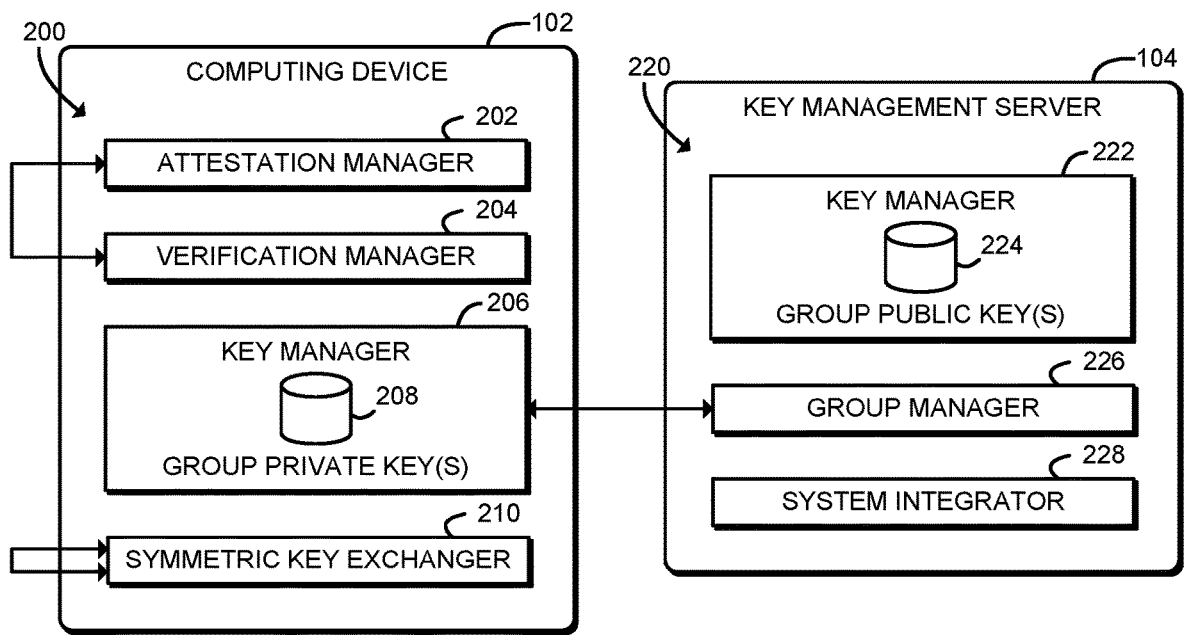
FIG. 2 is a simplified block diagram of at least one embodiment of various environments that may be established by the system of FIG. 1.

Referring now to FIG. 2, in an illustrative embodiment, each computing device 102 establishes an environment 200 during operation. The illustrative environment 200 includes an attestation manager 202, a verification manager 204, a key manager 206, and a symmetric key exchanger 210. The various components of the environment 200 may be embodied as hardware, firmware, software, or a combination thereof. As such, in some embodiments, one or more of the components of the environment 200 may be embodied as circuitry or collection of electrical devices (e.g., attestation manager circuitry 202, verification manager circuitry 204, key manager circuitry 206, and/or symmetric key exchanger circuitry 210). It should be appreciated that, in such embodiments, one or more of the attestation manager circuitry 202, the verification manager circuitry 204, the key manager circuitry 206, and/or the symmetric key exchanger circuitry 210 may form a portion of the processor 120, the I/O subsystem 122, and/or other components of the computing device 102. Additionally, in some embodiments, one or more of the illustrative components may form a portion of another component and/or one or more of the illustrative components may be independent of one another.

The attestation manager 202 is configured to receive from another device a request for attestation to an interface implemented by the computing device 102. The interface may be embodied as an instance of an object model implemented by the computing device 102 or a membership of the computing device 102 in a subsystem including other computing devices 102 and/or subsystems. The attestation manager 202 is further configured to send, to the other device, an attestation to the interface based on a group private key 208 associated with the interface. As described further below, the attestation is verifiable with a group public key 224 that corresponds to the group private key 208.

The verification manager 204 is configured to send a request for attestation to another computing device 102. The request for attestation is indicative of an interface, which may embodied as an instance of an object model implemented by the other computing device 102 or a membership of the computing device 102 in a subsystem, as described above. The verification manager 204 is further configured to receive an attestation from the other computing device 102 in response to sending the request and to verify the second attestation with a group public key 224 that corresponds to the requested interface. The verification manager 204 may be further configured to select a group certificate indicative of the group public key 224 as a function of the group name of a multicast address of the request, where the multicast address is synonymous with the group name.

The key manager 206 is configured to select a group private key 208 for the requested interface in response to receipt of a request for attestation. As described above, the group private key 208 is associated with the interface implemented by the computing device 102. The group private key 208 is provisioned to the computing device 102 prior to receipt of the request. The group private key 208 may be embodied as an enhanced privacy identifier (EPID) private key. The key manager 206 may be further configured to perform a join protocol with a group leader to receive the group private key 208. The group leader may be embodied as the key management server 104 or as another computing device 102, such as a member of a subsystem other than the computing device 102.

The symmetric key exchanger 210 is configured to securely exchange a symmetric session key with another computing device 102 in response to sending an attestation to the other computing device 102 and/or verifying an attestation received from the other computing device 102. The symmetric key exchanger 210 is further configured to securely communicate with the other computing device 102 using the symmetric session key.

Although illustrated as establishing an environment 200 including the attestation manager 202, the verification manager 204, the key manager 206, and the symmetric key exchanger 210, it should be understood that in some embodiments a computing device 102 may establish an environment including a subset of the components of the environment 200. For example, in some embodiments the computing device 102 may establish an environment including the attestation manager 202 and the key manager 206 but not the verification manager 204. As another example, a computing device 102 may establish an environment including the verification manager 204 but not the attestation manager 202. As an additional example, in some embodiments a computing device 102 may establish an environment that does not include the symmetric key exchanger 210.

Still referring to FIG. 2, in the illustrative embodiment, the key management server 104 establishes an environment 220 during operation. The illustrative environment 220 includes a key manager 222, a group manager 226, and, in some embodiments, a system integrator 228. The various components of the environment 200 may be embodied as hardware, firmware, software, or a combination thereof. As such, in some embodiments, one or more of the components of the environment 220 may be embodied as circuitry or collection of electrical devices (e.g., key manager circuitry 222, group manager circuitry 226, and/or system integrator circuitry 228). It should be appreciated that, in such embodiments, one or more of the key manager circuitry 222, the group manager circuitry 226, and/or the system integrator circuitry 228 may form a portion of the processor 140, the I/O subsystem 142, and/or other components of the key management server 104. Additionally, in some embodiments, one or more of the illustrative components may form a portion of another component and/or one or more of the illustrative components may be independent of one another.

The key manager 222 is configured to establish a group public key 224 associated with an interface. The group public key 224 is associated with a plurality of group private keys 208. For example, the group public key 224 may be embodied as an enhanced privacy identifier (EPID) public key, and each of the group private keys 208 may be embodied as an EPID private key. As described above, the interface may include an instance of an object model implemented by each of the computing devices 102 or a membership of each of the computing devices 102 in a subsystem.

The group manager 226 is configured to provision one or more computing devices 102 with the group private keys 208 associated with the group public key 224. As described above, each computing device implements the interface associated with the group public key 224 and is provisioned with a group private key 208 associated with that group public key 224. Provisioning the computing devices 102 may include executing an EPID join protocol with each of the computing devices 102. In some embodiments, the environment 220 may include the system integrator 228, which is configured to integrate the computing devices 102 in the subsystem associated with the public key 224.

Although illustrated in FIG. 2 as being established by the key management server 104, it should be understood that in some embodiments, the environment 220 may be established by another device. For example, in some embodiments, a computing device 102 that is the group leader of a subsystem may establish the environment 220.

Figure 3:
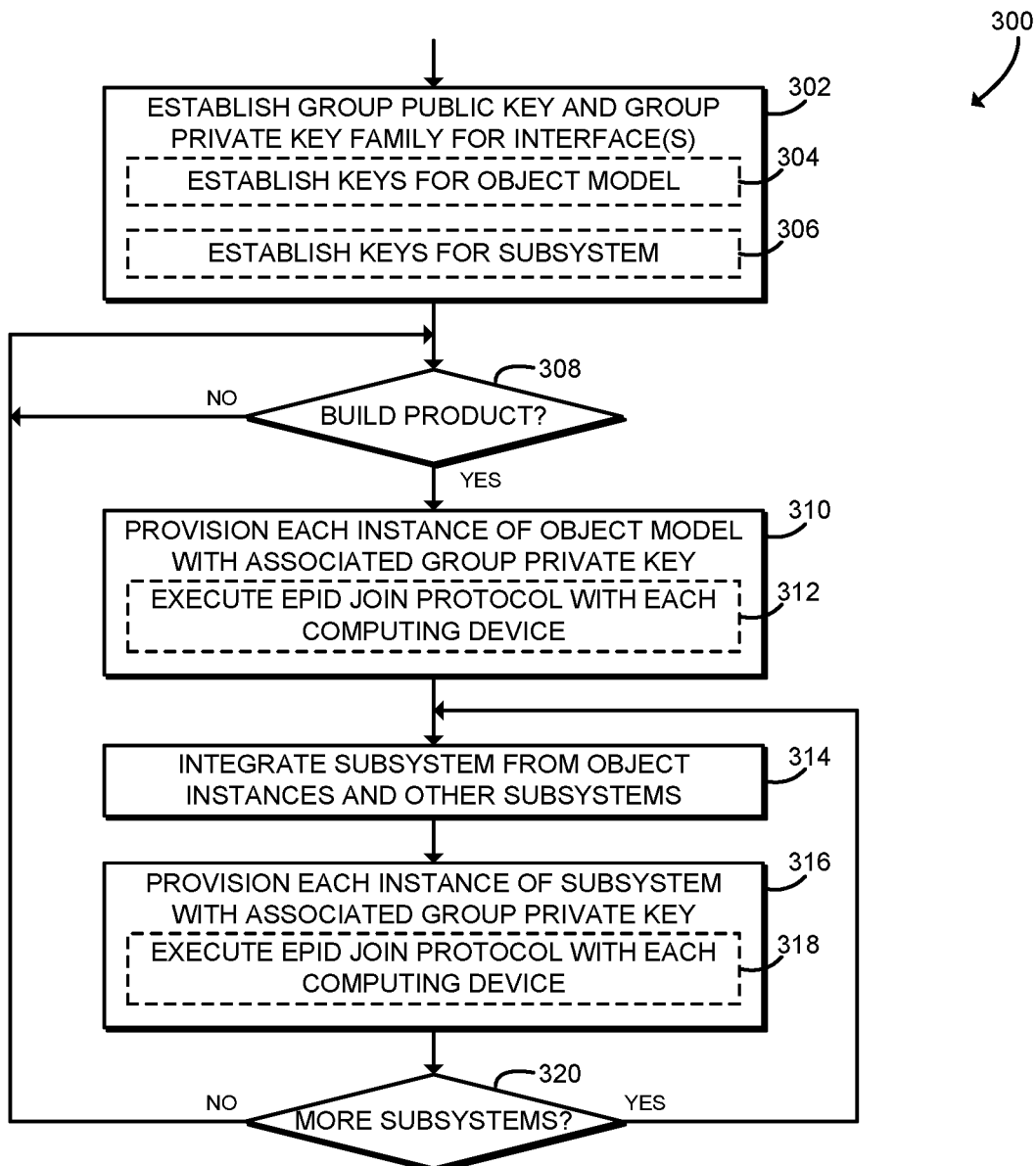
FIG. 3 is a simplified flow diagram of at least one embodiment of a method for hierarchical key management that may be executed by a key management server of the system of FIGS. 1-2.

Referring now to FIG. 3, in use, the key management server 104 may execute a method 300 for hierarchical key management. It should be appreciated that, in some embodiments, the method 300 may be embodied as various instructions stored on a computer-readable media, which may be executed by the processor 140, the I/O subsystem 142, and/or other components of the key management server 104 to cause the key management server 104 to perform the method 300. The computer-readable media may be embodied as any type of media capable of being read by the key management server 104 including, but not limited to, the memory 144, the data storage device 146, firmware devices, and/or other media. Additionally or alternatively, it should be appreciated that, in some embodiments, the operations of the method 300 may be performed by one or more components of the environment 220 of the key management server 104 as shown in FIG. 2.

The method 300 begins in block 302, in which the key management server 104 establishes a group public key 224 for each interface to be managed. Each group public key 224 is associated with a family of group private keys 208. As described further below, each group private key 208 of a particular family may generate an attestation (e.g., a cryptographically signed measurement) that may be verified using the associated group public key 224. In the illustrative embodiment, the particular group private key 208 used to generate an attestation may not be identified, and the key management server 104 does not have access to any of the group private keys 208. For example, each group public key 224 may be embodied as an enhanced privacy identifier (EPID) public key.

In some embodiments, in block 304 the key management server 104 may establish a group public key 224 for each object model interface that will be implemented by computing devices 102. For example, a manufacturer, an independent software vendor (ISV), or another provider of a computing device 102 may generate a group public key 224 for each object model implemented by the computing devices 102 produced by that entity. In some embodiments, in block 306 the key management server 104 may establish a group public key 224 for each subsystem that will be composed from computing devices 102. For example, a manufacturer or system integrator may generate a group public key 224 for each subsystem that will be managed by that entity.

Note that the group name for each group public key 224 may be chosen to align with the function, component, or device identifier meaningful at the desired level of system decomposition. The group name may therefore be synonymous with the object model notion of function decomposition. As described further below, a group policy may require that a multi-cast address for attestation requests and responses to be synonymous with the group name, which may simplify group policy management, such that any entity knowing the group name also knows how to configure. For example, an IP multicast group may be used for exchanging messages between group members, and if the IP multicast address is known, then the computing device 102 may already know which group credential to select.

In block 308, the key management server 104 determines whether to build a product. The product includes multiple computing devices 102 that may be assembled, connected, or otherwise composed into a hierarchical structure of sub-systems. The key management server 104 may build a product during manufacture, during deployment, after deployment, or at any other appropriate time. If the key management server 104 determines not to build a product, the method 300 loops back to block 308 to continue monitoring for building a product. If the key management server 104 determines to build a product, the method 300 advances to block 310.

In block 310, the key management server 104 provisions each computing device 102 that implements an instance of an object model interface with a group private key 208 associated with the corresponding group public key 224. Provisioning the computing device 102 with the group private key 208 indicates that the computing device 102 has been verified to implement the associated object model interface. The key management server 104 may provision each instance of a device, component, or functional element that implements a particular interface according to an object model that is meaningful to a particular subsystem. Thus, the key management server 104 may also verify the functionality of the computing device 102 prior to provisioning the group private key 208. Each function of the subsystem may be supplied by multiple or disparate computing devices 102 (e.g., multiple sensors, actuators, or platforms). Each of these devices may satisfy the computational requirement according to a common object model.

In some embodiments, in block 312, the key management server 104 may execute an EPID join protocol with each computing device 102 to provision the group private key 208. The EPID join protocol securely provisions the computing device 102 with a unique EPID private key, without allowing the key management server 104 to retain or otherwise access the EPID private key. The key management server 104 using the EPID join protocol ensures that each computing device 102 receives a discrete EPID private key for the group associated with an object model interface, enabling each computing device 102 to participate in a subsystem as an instance of that object model interface that performs an expected function or role. As described below, when the time comes for members of a subsystem to establish trust in their participant counterparts (e.g., other computing devices 102 in the subsystem), each computing device 102 may authenticate the other as an instance of the respective object and agree to symmetric keys that may be used to protect data authorized to be exchanged between the instances of the objects (according to the subsystem design). As described further below, this design may allow the subsystem and object models to operate consistently even though there may be different or multiple computing devices 102 that provide the object model interface functionality.

In block 314, the key management server 104 integrates a subsystem from one or more instances of object model interfaces and/or other subsystems. For example, the key management server 104 may integrate multiple computing devices 102 that implement object model interfaces used for a subsystem. The key management server 104 may verify the object model interfaces implemented by the computing devices 102, for example by executing a verification process as described further below in connection with FIG. 8.

In block 316, the key management server 104 provisions each computing device 102 included in the subsystem with a group private key 208 associated with the corresponding group public key 224. Provisioning the computing device 102 with the group private key 208 indicates that the computing device 102 has been included in the associated subsystem. The key management server 104 may provision group private keys 208 to computing devices 102 that expose an interface to a super-system, which may allow the subsystem to attest its collective function(s) to the super-system. In some embodiments, in block 318, the key management server 104 may execute an EPID join protocol with each computing device 102 to provision the group private key 208.

In block 320, the key management server 104 determines whether additional subsystems should be integrated. For example, the key management server 104 may integrate additional subsystems at the same hierarchical level and/or may integrate one or more super-systems that include previously integrated subsystems. If no additional subsystems remain to be integrated, the method 300 loops back to block 308, in which the key management server 104 may build additional products. If additional subsystems should be integrated, the method 300 loops back to block 314 to continue integrating subsystems.

Although illustrated in FIG. 3 as a method 300 performed by the key management server 104, it should be understood that in some embodiments, the operations of the method 300 may be performed in one or more separate methods by one or more separate devices. For example, a manufacturer or ISV may perform the operations of block 310 to provision group private keys 208 associated with object model interfaces to the computing devices 102. As another example, a system integrator, service, or manufacturing component authorized to compose subsystems may perform the operations of blocks 314, 316 to integrate a subsystem and provision group private keys 208 associated with the subsystem to the computing devices 102. Those operations may, in turn, be performed by multiple manufacturers, ISVs, system integrators, and/or other entities to integrate the computing devices 102 and subsystems into one or more products or other super-systems.

Figure 4:
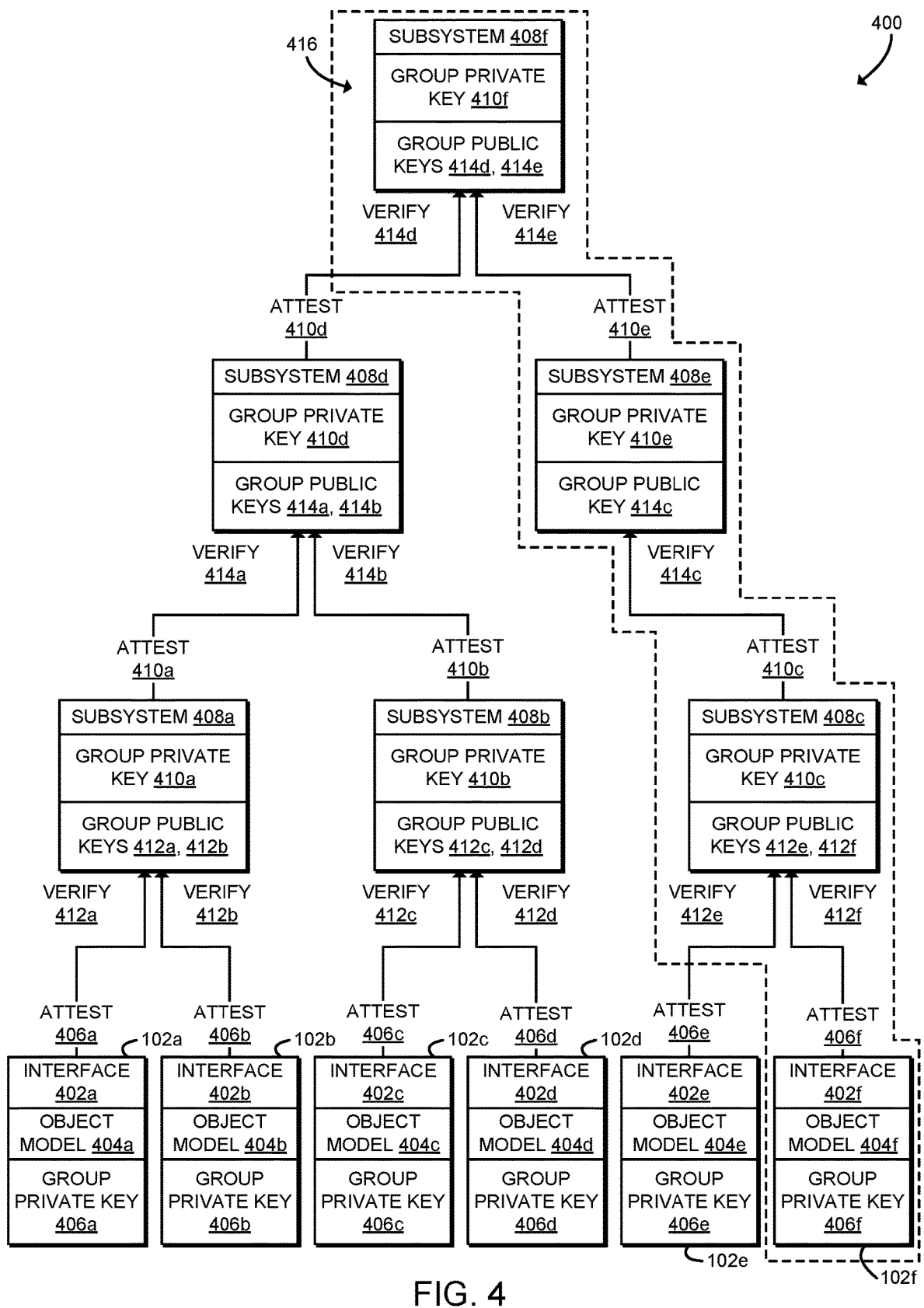
FIG. 4 is a schematic diagram illustrating at least one embodiment of a hierarchical structure that may be managed by the system of FIGS. 1-2.

Referring now to FIG. 4, a diagram 400 illustrates a hierarchical tree of subsystems and object model interfaces that may be managed by the system 100. The diagram 400 may represent, for example, a manufactured product composed from a hierarchical structure of sub-products and component computing devices 102. For example, the diagram 400 may represent a product such as an airplane, a vehicle engine, or other complex manufactured product that includes multiple component computing devices 102.

Starting at the leaf nodes, the hierarchical tree includes six computing devices 102a through 102f. Illustratively, each computing device 102 implements a corresponding object model interface 402 and object model 404. Each computing device 102 has been provisioned with a group private key 406 for the corresponding interface 402. For example, the computing device 102a has been provisioned with the group private key 406a for the interface 402a, the computing device 102b has been provisioned with the group private key 406b for the interface 402b, and so on. Additionally, although illustrated as implementing a single interface 402, it should be understood that each computing device 102 may implement multiple interfaces 402 and thus be provisioned with multiple group private keys 406.

As shown, each computing device 102 is included in a subsystem 408. Illustratively, computing devices 102a, 102b are included in subsystem 408a, computing devices 102c, 102d are included in subsystem 408b, and computing devices 102e, 102f are included in subsystem 408c. Each subsystem 408 is further associated with a group private key 410. For example, the subsystem 408a is associated with the group private key 410a, the subsystem 408b is associated with the group private key 410b, and so on. As described further below, each computing device 102 included in a subsystem 408 may be provisioned with the corresponding group private key 410, which indicates group membership. Each subsystem 408 is further associated with one or more group public keys 412 that may be used to verify attestations generated with the group private keys 406 of the computing devices 102 included in that subsystem 408. For example, the subsystem 408a may use the group public keys 412a, 412b to verify an attestation generated with the group private keys 406a, 406b of the computing devices 102a, 102b, respectively. One or more of the computing devices 102 included in the subsystem 408 may store or otherwise access the group public keys 412, for example by storing a certificate that includes the group public key 412.

Each subsystem 408 may be further included in one or more higher-level subsystems 408. For example, the subsystems 408a, 408b may be included in the subsystem 408d, the subsystem 408c may be included in the subsystem 408e, and the subsystems 408d, 408e may be included in the subsystem 408f. Of course, the subsystem 408f may be further included in additional subsystems not illustrated in FIG. 4. As shown, each higher-level subsystem 408 is also associated with a group private key 410, and each higher-level subsystem 408 may be associated with one or more group public keys 414 that may be used to verify attestations generated with the group private keys 410 of lower-level subsystems 408. Each subsystem 408 and/or computing device 102 may attest to providing a particular function. For example, an airplane exit door may assert emergency egress functionality using an aircraft door subsystem. The door, wings and fuselage form yet another subsystem that supports the functionality of flight. Group membership may be asserted by any or all of the sub-components of a group.

Each computing device 102 may have a position in the hierarchical tree 400 that includes all of the subsystems 408 at various levels in the hierarchical tree 400 that include the computing device 102. For example, as shown in FIG. 4, the computing device 102f has a position 416 in the tree 400. The position 416 includes the subsystems 408f, 408e, 408c, starting from the root of the tree 400. As described below in connection with FIG. 6, the set of group private keys 208 corresponding to the position 416 may form a trust tree that includes of all the subsystems for a particular computing device 102.

Figure 5:
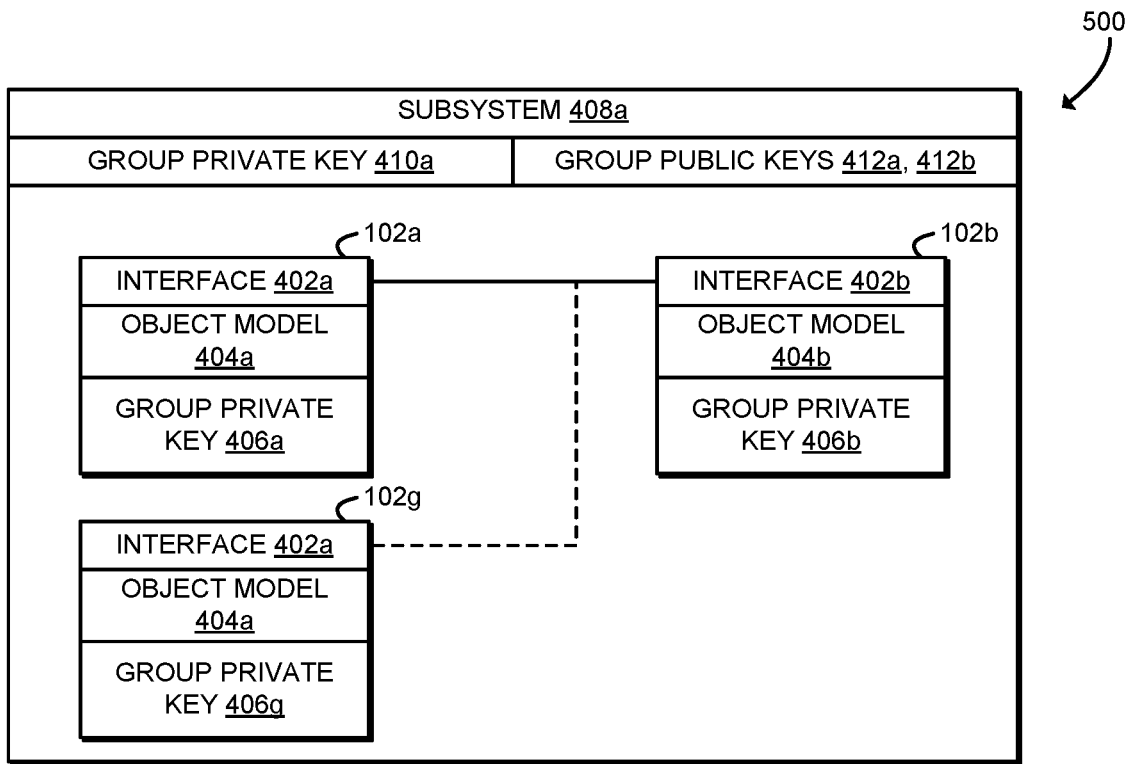
FIG. 5 is a schematic diagram illustrating at least one embodiment of a product subsystem that may be composed by the system of FIGS. 1-2.

Referring now to FIG. 5, a diagram 500 illustrates object interface interactions within a particular subsystem 408. The diagram 500 illustrates the subsystem 408a, which includes the computing devices 102a, 102b. As shown, the subsystem 408a includes a binding between the interface 402a of the computing device 102a and the interface 402b of the computing device 102b. For example, the interface 402a may produce data that is consumed by the interface 402b. The computing devices 102a, 102b may generate attestations based on their provisioned group private keys 406a, 406b, respectively, and those attestations may be verified using the group public keys 412a, 412b, respectively. Additionally, each of the computing devices 102a, 102b may be a member of the subsystem 408a by being provisioned with the group private key 410a corresponding to the subsystem 408a. Thus, the diagram 500 illustrates a subsystem 408a composed of computing devices 102a, 102b, each performing a different or specialized function. One or more of the computing devices 102a, 102b may represent the subsystem 408a externally using the group private key 410a associated with the subsystem 408a, but each representative may not impersonate, delegate, or propagate the authorization to represent the subsystem 408a (due to the fact that each possesses a unique private key 406 that may not be copied or transferred).

The diagram 500 also illustrates a computing device 102g, which implements the interface 402a and the object model 404a. As shown, the computing device 102g is provisioned with the group private key 406g. All instances of the interface 402a may be provisioned with group private keys that are members of the same group (i.e., that may be verified by the same group public key 412a). Thus, the group private key 406g, while different from the group private key 406a, may also be used to generate attestations that are verifiable with the group public key 412a. Thus, the computing device 102a may be replaced with the computing device 102g and a binding may be established between the interface 402a of the computing device 102g and the interface 402b of the computing device 102b. The computing devices 102g, 102b may communicate without modification of their interfaces 402a, 402b. After that replacement, the computing devices 102g, 102b may generate attestations based on their provisioned group private keys 406g, 406b, respectively, and those attestations may be verified using the group public keys 412a, 412b, respectively.

Figure 6:
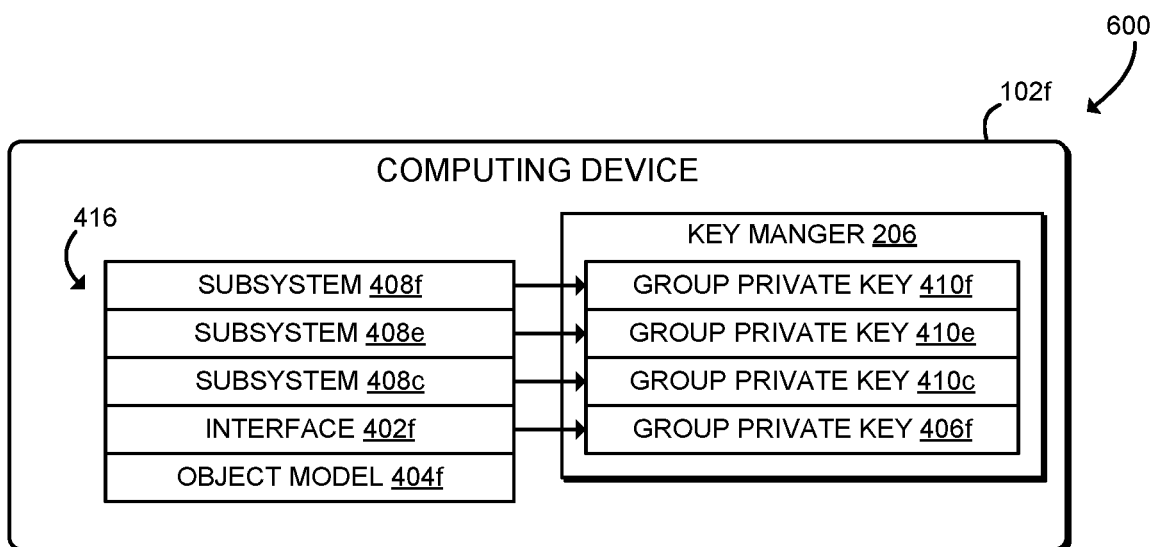
FIG. 6 is a schematic diagram illustrating at least one embodiment of hierarchical interfaces that may be implemented by a computing device of the system of FIGS. 1-2.

Referring now to FIG. 6, a diagram 600 illustrates the hierarchical interfaces that may be established by a computing device 102. The diagram 600 illustrates the computing device 102f, which has the position 416 in the hierarchical tree 400, as shown in FIG. 4. As shown, the position 416 may be embodied as a set of layered interfaces implemented by the computing device 102f, which allow the computing device 102f to behave as an entity controlling resources at various layers in the subsystem hierarchy. As shown, each layer in the tree position 416 is associated with a particular group private key provisioned to the computing device 102f. For example, the subsystem 408f is associated with the group private key 410f, the subsystem 408e is associated with the group private key 410e, and so on. Note that the use of subsystem keys may not remove the expectation that each computing device 102 may also have a manufacturer supplied attestation key (EPID or otherwise) used for onboarding the computing device 102 into a network or subsystem.

Figure 7:
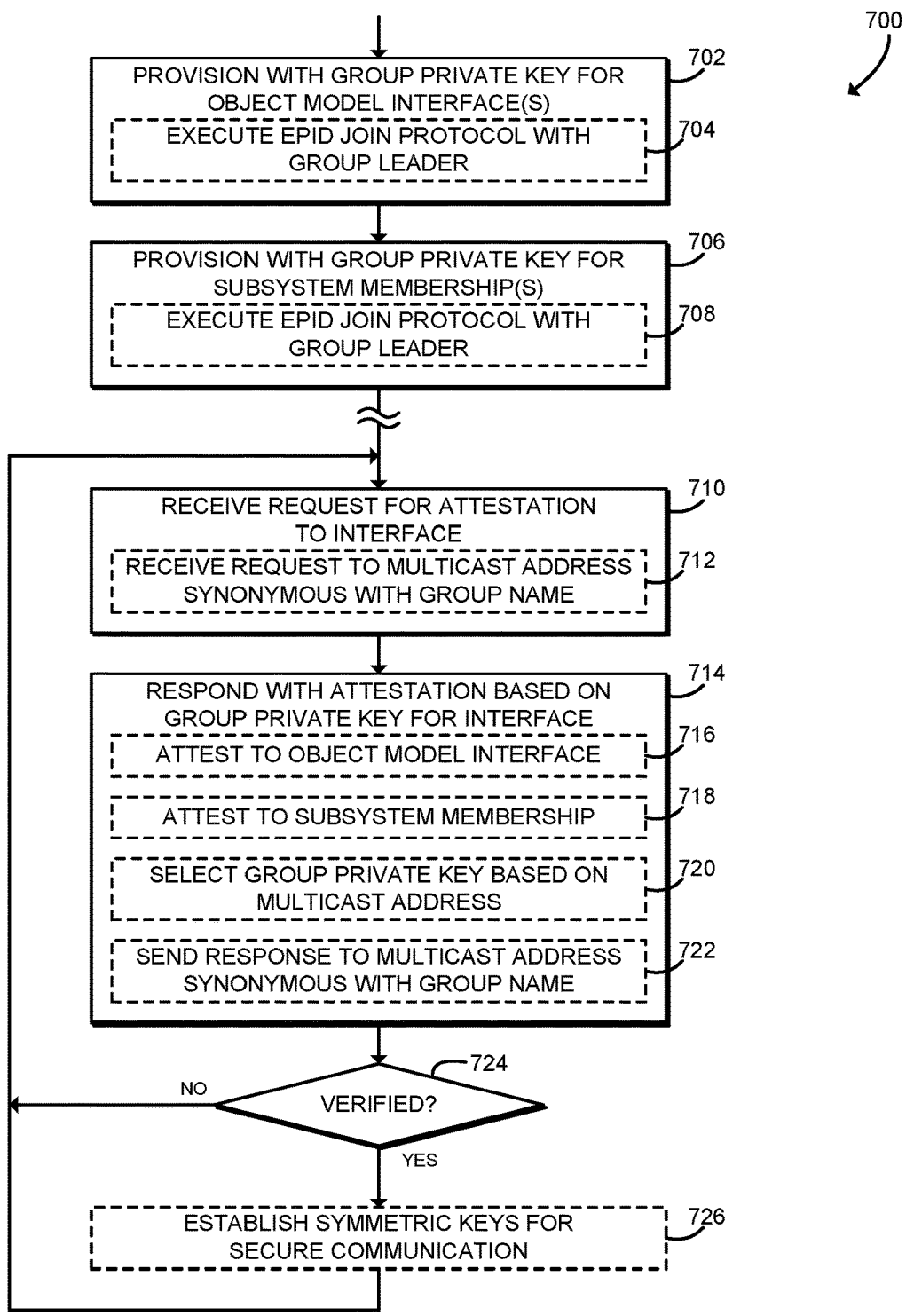
FIG. 7 is a simplified flow diagram of at least one embodiment of a method for component attestation that may be executed by a computing device of FIGS. 1-2.

Referring now to FIG. 7, in use, a computing device 102 may execute a method 700 for component attestation. It should be appreciated that, in some embodiments, the operations of the method 700 may be performed by one or more components of the environment 200 of the computing device 102 as shown in FIG. 2. The method 700 begins in block 702, in which the computing device 102 may be provisioned with a group private key 208 for one or more object model interfaces implemented by the computing device 102. The computing device 102 may be provisioned with group private keys 208 for object interfaces, for example, during a manufacturing process or during deployment. In some embodiments, the group private keys 208 may be hard-coded or otherwise securely embedded in the computing device 102, for example using a write-once technique. In some embodiments, in block 704 the computing device 102 may execute an enhanced privacy identifier (EPID) join protocol with a group leader to be provisioned with the group private keys 208. The group leader may be, for example, the key management server 104, another computing device 102, or other device authorized to provision group private keys 208.

In block 706, the computing device 102 may be provisioned with a group private key 208 for one or more subsystems that the computing device 102 is a member of. The computing device 102 may be provisioned with the group private keys 208, for example, during system integration, when joining a subsystem, during deployment, or at other times. In some embodiments, in block 708 the computing device 102 may execute an enhanced privacy identifier (EPID) join protocol with a group leader to be provisioned with the group private keys 208. The group leader may be, for example, the key management server 104, another computing device 102, or other device authorized to provision group private keys 208. The group leader function may be implemented by a service or manufacturing component authorized to compose subsystems. In an IoT deployment scenario, the group leader may be a network console that assists an installer while configuring the zones and IFTTT relationships.

After being provisioned with group private keys 208, in block 710 the computing device 102 may receive a request for attestation to an interface. For example, the computing device 102 may receive a request to attest to an object model interface implemented by the computing device 102, or the computing device 102 may receive a request to attest to membership in a subsystem. In some embodiments, in block 712 the computing device 102 may receive the request for attestation via a multicast address that is synonymous with the group name of the interface. Thus, the multicast address may be used to identify the requested interface and associated group private key 208. The request for attestation may be received from, for example, another computing device 102 in the same subsystem as the computing device 102, from a computing device 102 in a super-system that includes the subsystem of the computing device 102, from an external verifier, or from any other verifying entity.

In block 714, the computing device 102 responds to the request with an attestation based on the group private key 208 for the requested interface. The attestation may be embodied as any cryptographically signed measurement or other data that may be used to verify that the computing device 102 has been provisioned with the group private key 208. In some embodiments, in block 716 the computing device 102 may attest to an object model interface implemented by the computing device 102. In some embodiments, in block 718 the computing device 102 may attest to membership in a subsystem. In some embodiments, in block 720 the computing device 102 may select the group private key 208 for the attestation based on the multicast address of the request. As described above in connection with block 712, the multicast address may be synonymous with the group name. Thus, the computing device 102 may be capable of selecting the correct group private key 208 for such a multicast request without additional configuration. In some embodiments, in block 722 the computing device 102 may send the attestation response to the multicast address synonymous with the group name of the requested interface.

In block 724, the computing device 102 determines whether the attestation was verified by the requesting entity. For example, the computing device 102 may receive an acknowledgment or other confirmation from another computing device 102 indicating that verification was successful. If not verified, the method 700 loops back to block 710, in which the computing device 102 may process additional requests for attestation. If verified, the method 700 advances to block 726.

In block 726, in some embodiments the computing device 102 may establish one or more symmetric keys for communication with the verifying entity. For example, the computing device 102 may establish a symmetric session key with another computing device 102 in the same subsystem, and the symmetric session key may be used to protect network communications within the subsystem. The symmetric key exchange may follow multiple potential strategies for provisioning the computing devices 102 with pair-wise session keys. For example, one approach may rely on a key exchange protocol between the computing devices 102, such as Diffie-Hellman key exchange, RSA key exchange, PAKE, or another variety. Continuing that example, each group member computing device 102 may obtain group symmetric keys for message integrity and/or confidentiality by performing a key exchange protocol where the symmetric integrity and/or confidentiality key(s) may be generated by the content originator and wrapped using an RSA or LWE key encryption key (KEK), which is signed using the group private key for either the subsystem (if representing an interface protocol consistent with inter-system semantics) or an object model interface (if representing an interface protocol consistent with intra-system semantics). Next, the entire message may be multi-cast over the group multi-cast channel. Because the message is multi-cast, note that any recipient of the initial message $m_0$ may authenticate the KEK to the group and then subsequently re-transmit the message without loss of authenticity. For example, if the original sender was a sleepy node, a gateway could retransmit to subscribers while the originator goes back to sleep. This may be particularly useful for IoT applications. Each computing device 102 that receives the initial message $m_0$ may configure a secure communication session and/or VPN using the symmetric keys negotiated therein. An unlimited number of subsequent messages $m_1$ to $m_n$ may then be transmitted within the group-specific VPN context without incurring additional key exchange overhead.

As another example of a symmetric key exchange strategy, another approach relies on a key exchange service that provisions the pairwise keys according to a policy that defines the subsystem. This strategy may perform a key exchange protocol as described above, with the exception that the computing devices 102 may be required to authenticate their object model interfaces to the key service where a policy is applied that enforces subsystem semantics. For example, subsystem semantics may require that only a particular object model interface (e.g., "Obj1") may write (send) data to another object model interface (e.g., "Obj2"). These semantics may be asserted, for example, by supplying a pairwise symmetric key that is encrypted to Obj2 and authorized for decrypt only and where a copy of the symmetric key is authorized for encryption only. After any symmetric keys are exchanged, the method 700 loops back to block 710, in which the computing device 102 may process additional requests for attestation.

Figure 8:
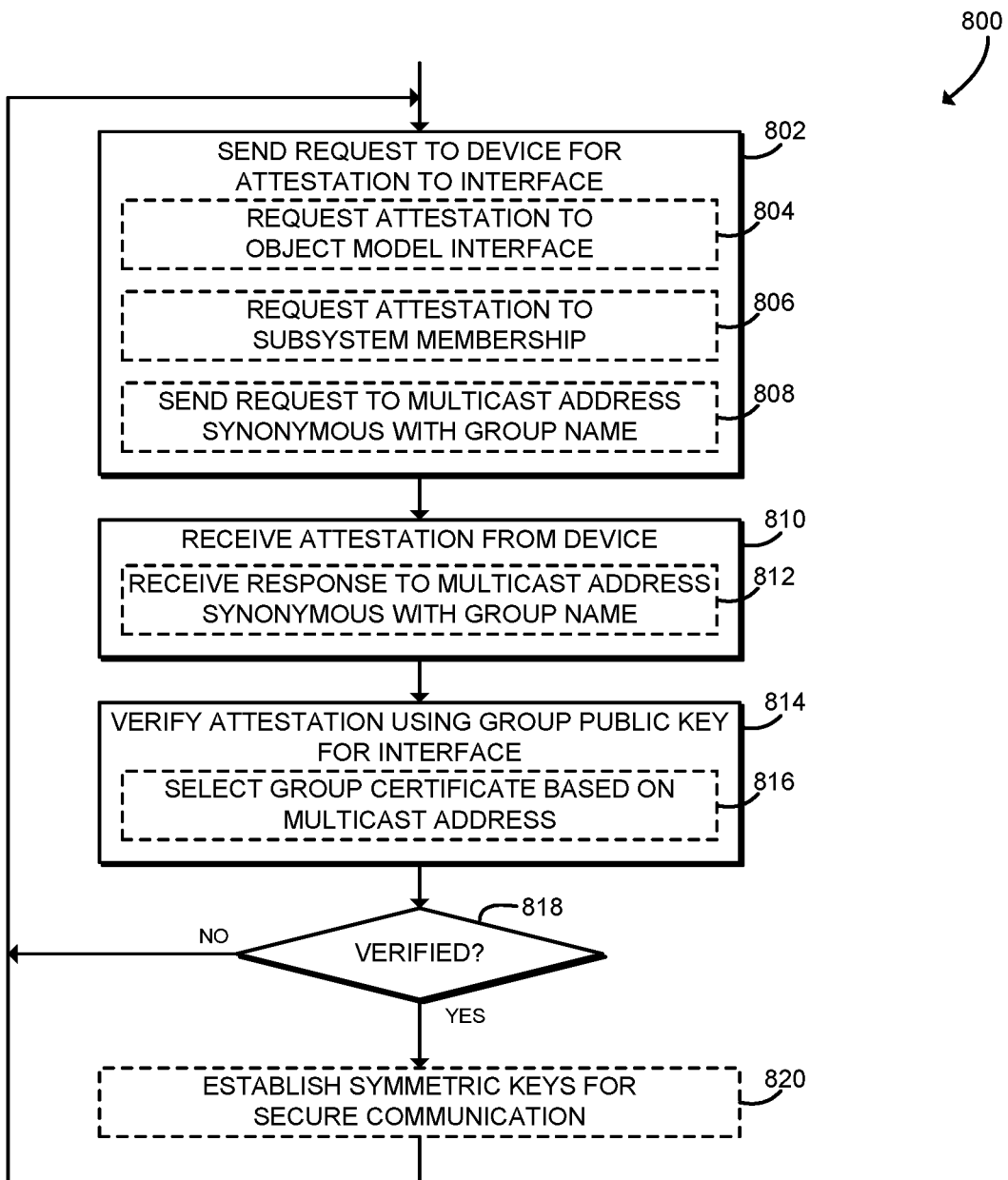
FIG. 8 is a simplified flow diagram of at least one embodiment of a method for component verification that may be executed by a computing device of FIGS. 1-2.

Referring now to FIG. 8, in use, a computing device 102 may execute a method 800 for component verification. It should be appreciated that, in some embodiments, the operations of the method 800 may be performed by one or more components of the environment 200 of the computing device 102 as shown in FIG. 2. The method 800 begins in block 802, in which the computing device 102 sends a request to another computing device 102 for attestation to an interface. In some embodiments, in block 804 the computing device 102 may request attestation to an object model interface. In some embodiments, in block 806 the computing device 102 may request attestation to membership in a particular subsystem. The computing device 102 may send the request for attestation to one or more members of the particular subsystem, for example by broadcasting a request to all computing devices 102 in the subsystem, sending the request to a randomly selected computing device 102 of the subsystem, or otherwise sending the request to a member of the subsystem. In some embodiments, in block 808 the computing device 102 may send the request via a multicast address that is synonymous with the group name of the interface.

In block 810, the computing device 102 receives an attestation from the other computing device 102. As described above in connection with FIG. 7, the attestation may be embodied as any cryptographically signed measurement or other data that may be used to verify that the other computing device 102 has been provisioned with the group private key 208. In some embodiments, in block 812 the computing device 102 may receive the attestation via the multicast address that is synonymous with the group name of the interface.

In block 814, the computing device 102 verifies the attestation using the group public key 224 for the requested interface. For example, the computing device 102 may use the group public key 224 to verify a cryptographic signature or other cryptographic data included in the attestation. The group public key 224 may be used to verify that the attestation was generated with a group private key 208 of the same group, but may not require that the particular group private key 208 be identified or otherwise known. Group identity may be semantically equal to authorization; hence, group credentials may serve the same purpose as identity credentials with authorization permissions (e.g., attribute certificates or Active Directory PAC structures). However, as described above, the system 100 does not depend on issuance of an identity credential that protects the authorization data. The group public key 224 may be stored by the computing device 102 or accessed from a remote source. In some embodiments, the group public key 224 and/or other necessary validation material may be provisioned to the computing device 102 in a write-once/read-only fashion. In some embodiments, in block 816 the computing device 102 may select a group certificate for the group public key 224 based on the multicast address of the attestation request and/or response.

In block 818, the computing device 102 determines whether the attestation was successfully verified. If not, the method 800 loops back to block 802, in which the computing device 102 may request additional attestations. In some embodiments, the computing device 102 may also generate an error message, perform a security response, and/or perform any other policy-based action in response to determining that the attestation was not verified. If the attestation was successfully verified, the method 800 advances to block 820.

In block 820, in some embodiments the computing device 102 may establish one or more symmetric keys for communication with the other computing device 102. For example, the computing device 102 may establish a symmetric session key with another computing device 102 in the same subsystem, and the symmetric session key may be used to protect network communications within the subsystem. As another example, the computing device 102 may establish a symmetric session key with another computing device 102 in a lower-level subsystem that exposes an interface to the computing device 102, and the symmetric session key may be used to protect network communications between the subsystems. The computing device 102 may provision the symmetric session keys using one or more symmetric key exchange strategies, as described above in connection with block 726 of FIG. 7. After any symmetric keys are established, the method 800 loops back to block 802, in which the computing device 102 may request additional attestations.

It should be appreciated that, in some embodiments, the methods 700 and/or 800 may be embodied as various instructions stored on a computer-readable media, which may be executed by the processor 120, the I/O subsystem 122, and/or other components of the computing device 102 to cause the computing device 102 to perform the respective method 700 and/or 800. The computer-readable media may be embodied as any type of media capable of being read by the computing device 102 including, but not limited to, the memory 124, the data storage device 126, firmware devices, and/or other media.

EXAMPLES

Illustrative examples of the technologies disclosed herein are provided below. An embodiment of the technologies may include any one or more, and any combination of, the examples described below.

Example 1 includes a computing device for collective authorization, the computing device comprising: an attestation manager to receive a request for attestation to an interface implemented by the computing device from a second computing device; and a key manager to select a group private key for the interface in response to receipt of the request for attestation, wherein the group private key is associated with the interface implemented by the computing device and is provisioned to the computing device; wherein the attestation manager is further to send, to the second computing device, an attestation to the interface based on the group private key in response to selection of the group private key, wherein the attestation is verifiable with a group public key that corresponds to the group private key.

Example 2 includes the subject matter of Example 1, and wherein the group private key is an enhanced privacy identifier (EPID) private key and the group public key is an EPID public key.

Example 3 includes the subject matter of any of Examples 1 and 2, and wherein the interface implemented by the computing device comprises an instance of an object model implemented by the computing device.

Example 4 includes the subject matter of any of Examples 1-3, and wherein the interface implemented by the computing device comprises a membership of the computing device in a subsystem, wherein the subsystem includes a plurality of computing devices.

Example 5 includes the subject matter of any of Examples 1-4, and wherein: the request for attestation to the interface comprises a request for attestation to an interface at a first level in a hierarchy of interfaces implemented by the computing device; and to select the group private key for the interface comprises to select the group private key for the interface at the first level in the hierarchy of interfaces from a plurality of group private keys, wherein each group private key of the plurality of group private keys is associated with an interface of the hierarchy of interfaces implemented by the computing device.

Example 6 includes the subject matter of any of Examples 1-5, and wherein: to receive the request for attestation comprises to receive the request for attestation via a multicast address, wherein the multicast address is synonymous with a group name of the group private key; to select the group private key comprises to select the group private key as a function of the group name of the multicast address; and to send the attestation comprises to send the attestation via the multicast address.

Example 7 includes the subject matter of any of Examples 1-6, and wherein the second computing device comprises a member of a subsystem, wherein the subsystem includes the computing device and the second computing device.

Example 8 includes the subject matter of any of Examples 1-7, and wherein: the second computing device comprises a member of a super-system, wherein the super-system includes a subsystem, and wherein the subsystem includes the computing device; and the interface implemented by the computing device is exposed to the super-system.

Example 9 includes the subject matter of any of Examples 1-8, and wherein the second computing device comprises an external verifier.

Example 10 includes the subject matter of any of Examples 1-9, and wherein the key manager is further to perform a join protocol with a group leader to receive the group private key, wherein to receive the request for attestation comprises to receive the request for attestation in response to performance of the join protocol.

Example 11 includes the subject matter of any of Examples 1-10, and wherein the group leader comprises a key management server.

Example 12 includes the subject matter of any of Examples 1-11, and wherein the group leader comprises a member of a subsystem other than the computing device, wherein the subsystem includes the computing device and the member.

Example 13 includes the subject matter of any of Examples 1-12, and further comprising a symmetric key exchanger to: securely exchange a symmetric session key with the second computing device in response to sending of the attestation to the second computing device; and securely communicate with the second computing device using the symmetric session key.

Example 14 includes the subject matter of any of Examples 1-13, and further comprising a verification manager to: send a second request for attestation to a third computing device, wherein the second request is indicative of a second interface; receive a second attestation from the third computing device in response to sending of the second request, wherein the second attestation is generated by the third computing device with a second group private key associated with the second interface; and verify the second attestation with a second group public key that corresponds to the second group private key.

Example 15 includes a computing device for collective authorization, the computing device comprising a verification manager to: send a request for attestation to a second computing device, wherein the request is indicative of an interface; receive an attestation from the second computing device in response to sending of the request, wherein the attestation is generated by the second computing device with a group private key associated with the interface; and verify the attestation with a group public key that corresponds to the group private key.

Example 16 includes the subject matter of Example 15, and wherein the group private key is an enhanced privacy identifier (EPID) private key and the group public key is an EPID public key.

Example 17 includes the subject matter of any of Examples 15 and 16, and wherein the interface comprises an instance of an object model to be implemented by the second computing device.

Example 18 includes the subject matter of any of Examples 15-17, and wherein the interface comprises a membership of the second computing device in a subsystem, wherein the subsystem includes a plurality of computing devices.

Example 19 includes the subject matter of any of Examples 15-18, and wherein: to send the request for attestation comprises to send the request for attestation via a multicast address, wherein the multicast address is synonymous with a group name of the group private key; and to receive the attestation comprises to receive the attestation via the multicast address.

Example 20 includes the subject matter of any of Examples 15-19, and wherein the verification manager is further to select a group certificate indicative of the group public key as a function of the group name of the multicast address.

Example 21 includes the subject matter of any of Examples 15-20, and wherein the second computing device comprises a member of a subsystem, wherein the subsystem includes the computing device and the second computing device.

Example 22 includes the subject matter of any of Examples 15-21, and wherein: the computing device comprises a member of a super-system, wherein the super-system includes a subsystem, and wherein the subsystem includes the second computing device; and the interface is exposed by the second computing device to the super-system.

Example 23 includes the subject matter of any of Examples 15-22, and further comprising a symmetric key exchanger to: securely exchange a symmetric session key with the second computing device in response to verification of the attestation; and securely communicate with the second computing device using the symmetric session key.

Example 24 includes the subject matter of any of Examples 15-23, and further comprising: an attestation manager to receive a second request for attestation to a second interface implemented by the computing device from a third computing device; and a key manager to select a second group private key for the second interface in response to receipt of the second request for attestation, wherein the second group private key is associated with the second interface implemented by the computing device and is provisioned to the computing device; wherein the attestation manager is further to send, to the third computing device, a second attestation to the second interface based on the second group private key in response to selection of the second group private key, wherein the second attestation is verifiable with a second group public key that corresponds to the second group private key.

Example 25 includes a computing device for credential provisioning, the computing device comprising: a key manager to establish a group public key associated with an interface, wherein the group public key is associated with a plurality of group private keys; and a group manager to provision a plurality of component computing devices with the plurality of group private keys, wherein each component computing device implements the interface and is provisioned with a group private key of the plurality of group private keys.

Example 26 includes the subject matter of Examples 25, and wherein the group public key is an enhanced privacy identifier (EPID) public key and each of the group private keys is an EPID private key.

Example 27 includes the subject matter of any of Examples 25 and 26, and wherein to provision the plurality of component computing devices comprises to execute an EPID join protocol with each of the plurality of component computing devices.

Example 28 includes the subject matter of any of Examples 25-27, and wherein the interface comprises an instance of an object model implemented by each of the component computing devices.

Example 29 includes the subject matter of any of Examples 25-28, and wherein the interface comprises membership of each of the component computing devices in the subsystem.

Example 30 includes the subject matter of any of Examples 25-29, and further comprising a system integrator to integrate the plurality of component computing devices in the subsystem.

Example 31 includes a method for collective authorization, the method comprising: receiving, by a computing device, a request for attestation to an interface implemented by the computing device from a second computing device; selecting, by the computing device, a group private key for the interface in response to receiving the request for attestation, wherein the group private key is associated with the interface implemented by the computing device and is provisioned to the computing device; and sending, by the computing device to the second computing device, an attestation to the interface using the group private key in response to selecting the group private key, wherein the attestation is verifiable with a group public key that corresponds to the group private key.

Example 32 includes the subject matter of Example 31, and wherein the group private key is an enhanced privacy identifier (EPID) private key and the group public key is an EPID public key.

Example 33 includes the subject matter of any of Examples 31 and 32, and wherein the interface implemented by the computing device comprises an instance of an object model implemented by the computing device.

Example 34 includes the subject matter of any of Examples 31-33, and wherein the interface implemented by the computing device comprises a membership of the computing device in a subsystem, wherein the subsystem includes a plurality of computing devices.

Example 35 includes the subject matter of any of Examples 31-34, and wherein: receiving the request for attestation to the interface comprises receiving a request for attestation to an interface at a first level in a hierarchy of interfaces implemented by the computing device; and selecting the group private key for the interface comprises selecting the group private key for the interface at the first level in the hierarchy of interfaces from a plurality of group private keys, wherein each group private key of the plurality of group private keys is associated with an interface of the hierarchy of interfaces implemented by the computing device.

Example 36 includes the subject matter of any of Examples 31-35, and wherein: receiving the request for attestation comprises receiving the request for attestation via a multicast address, wherein the multicast address is synonymous with a group name of the group private key; selecting the group private key comprises selecting the group private key as a function of the group name of the multicast address; and sending the attestation comprises sending the attestation via the multicast address.

Example 37 includes the subject matter of any of Examples 31-36, and wherein the second computing device comprises a member of a subsystem, wherein the subsystem includes the computing device and the second computing device.

Example 38 includes the subject matter of any of Examples 31-37, and wherein: the second computing device comprises a member of a super-system, wherein the super-system includes a subsystem, and wherein the subsystem includes the computing device; and the interface implemented by the computing device is exposed to the super-system.

Example 39 includes the subject matter of any of Examples 31-38, and wherein the second computing device comprises an external verifier.

Example 40 includes the subject matter of any of Examples 31-39, and further comprising performing, by the computing device, a join protocol with a group leader to receive the group private key, wherein receiving the request for attestation comprises receiving the request for attestation in response to performing the join protocol.

Example 41 includes the subject matter of any of Examples 31-40, and wherein the group leader comprises a key management server.

Example 42 includes the subject matter of any of Examples 31-41, and wherein the group leader comprises a member of a subsystem other than the computing device, wherein the subsystem includes the computing device and the member.

Example 43 includes the subject matter of any of Examples 31-42, and further comprising: securely exchanging, by the computing device, a symmetric session key with the second computing device in response to sending the attestation to the second computing device; and securely communicating, by the computing device, with the second computing device using the symmetric session key.

Example 44 includes the subject matter of any of Examples 31-43, and further comprising: sending, by the computing device, a second request for attestation to a third computing device, wherein the second request is indicative of a second interface; receiving, by the computing device, a second attestation from the third computing device in response to sending the second request, wherein the second attestation is generated by the third computing device with a second group private key associated with the second interface; and verifying, by the computing device, the second attestation with a second group public key that corresponds to the second group private key.

Example 45 includes a method for collective authorization, the method comprising: sending, by a computing device, a request for attestation to a second computing device, wherein the request is indicative of an interface; receiving, by the computing device, an attestation from the second computing device in response to sending the request, wherein the attestation is generated by the second computing device with a group private key associated with the interface; and verifying, by the computing device, the attestation with a group public key that corresponds to the group private key.

Example 46 includes the subject matter of Example 45, and wherein the group private key is an enhanced privacy identifier (EPID) private key and the group public key is an EPID public key.

Example 47 includes the subject matter of any of Examples 45 and 46, and wherein the interface comprises an instance of an object model to be implemented by the second computing device.

Example 48 includes the subject matter of any of Examples 45-47, and wherein the interface comprises a membership of the second computing device in a subsystem, wherein the subsystem includes a plurality of computing devices.

Example 49 includes the subject matter of any of Examples 45-48, and wherein: sending the request for attestation comprises sending the request for attestation via a multicast address, wherein the multicast address is synonymous with a group name of the group private key; and receiving the attestation comprises receiving the attestation via the multicast address.

Example 50 includes the subject matter of any of Examples 45-49, and further comprising selecting, by the computing device, a group certificate indicative of the group public key as a function of the group name of the multicast address.

Example 51 includes the subject matter of any of Examples 45-50, and wherein the second computing device comprises a member of a subsystem, wherein the subsystem includes the computing device and the second computing device.

Example 52 includes the subject matter of any of Examples 45-51, and wherein: the computing device comprises a member of a super-system, wherein the super-system includes a subsystem, and wherein the subsystem includes the second computing device; and the interface is exposed by the second computing device to the super-system.

Example 53 includes the subject matter of any of Examples 45-52, and further comprising: securely exchanging, by the computing device, a symmetric session key with the second computing device in response to verifying the attestation; and securely communicating, by the computing device, with the second computing device using the symmetric session key.

Example 54 includes the subject matter of any of Examples 45-53, and further comprising: receiving, by the computing device, a second request for attestation to a second interface implemented by the computing device from a third computing device; selecting, by the computing device, a second group private key for the second interface in response to receiving the second request for attestation, wherein the second group private key is associated with the second interface implemented by the computing device and is provisioned to the computing device; and sending, by the computing device to the third computing device, a second attestation to the second interface using the second group private key in response to selecting the second group private key, wherein the second attestation is verifiable with a second group public key that corresponds to the second group private key.

Example 55 includes a method for credential provisioning, the method comprising: establishing, by a computing device, a group public key associated with an interface, wherein the group public key is associated with a plurality of group private keys; and provisioning, by the computing device, a plurality of component computing devices with the plurality of group private keys, wherein each component computing device implements the interface and is provisioned with a group private key of the plurality of group private keys.

Example 56 includes the subject matter of Example 55, and wherein the group public key is an enhanced privacy identifier (EPID) public key and each of the group private keys is an EPID private key.

Example 57 includes the subject matter of any of Examples 55 and 56, and wherein provisioning the plurality of component computing devices comprises executing an EPID join protocol with each of the plurality of component computing devices.

Example 58 includes the subject matter of any of Examples 55-57, and wherein the interface comprises an instance of an object model implemented by each of the component computing devices.

Example 59 includes the subject matter of any of Examples 55-58, and wherein the interface comprises membership of each of the component computing devices in the subsystem.

Example 60 includes the subject matter of any of Examples 55-59, and further comprising integrating, by the computing device, the plurality of component computing devices in the subsystem.

Example 61 includes a computing device comprising: a processor; and a memory having stored therein a plurality of instructions that when executed by the processor cause the computing device to perform the method of any of Examples 31-60.

Example 62 includes one or more machine readable storage media comprising a plurality of instructions stored thereon that in response to being executed result in a computing device performing the method of any of Examples 31-60.

Example 63 includes a computing device comprising means for performing the method of any of Examples 31-60.

Example 64 includes a computing device for collective authorization, the computing device comprising: means for receiving a request for attestation to an interface implemented by the computing device from a second computing device; means for selecting a group private key for the interface in response to receiving the request for attestation, wherein the group private key is associated with the interface implemented by the computing device and is provisioned to the computing device; and means for sending, by the computing device to the second computing device, an attestation to the interface using the group private key in response to selecting the group private key, wherein the attestation is verifiable with a group public key that corresponds to the group private key.

Example 65 includes the subject matter of Example 64, and wherein the group private key is an enhanced privacy identifier (EPID) private key and the group public key is an EPID public key.

Example 66 includes the subject matter of any of Examples 64 and 65, and wherein the interface implemented by the computing device comprises an instance of an object model implemented by the computing device.

Example 67 includes the subject matter of any of Examples 64-66, and wherein the interface implemented by the computing device comprises a membership of the computing device in a subsystem, wherein the subsystem includes a plurality of computing devices.

Example 68 includes the subject matter of any of Examples 64-67, and wherein: the means for receiving the request for attestation to the interface comprises means for receiving a request for attestation to an interface at a first level in a hierarchy of interfaces implemented by the computing device; and the means for selecting the group private key for the interface comprises means for selecting the group private key for the interface at the first level in the hierarchy of interfaces from a plurality of group private keys, wherein each group private key of the plurality of group private keys is associated with an interface of the hierarchy of interfaces implemented by the computing device.

Example 69 includes the subject matter of any of Examples 64-68, and wherein: the means for receiving the request for attestation comprises means for receiving the request for attestation via a multicast address, wherein the multicast address is synonymous with a group name of the group private key; the means for selecting the group private key comprises means for selecting the group private key as a function of the group name of the multicast address; and the means for sending the attestation comprises means for sending the attestation via the multicast address.

Example 70 includes the subject matter of any of Examples 64-69, and wherein the second computing device comprises a member of a subsystem, wherein the subsystem includes the computing device and the second computing device.

Example 71 includes the subject matter of any of Examples 64-70, and wherein: the second computing device comprises a member of a super-system, wherein the super-system includes a subsystem, and wherein the subsystem includes the computing device; and the interface implemented by the computing device is exposed to the super-system.

Example 72 includes the subject matter of any of Examples 64-71, and wherein the second computing device comprises an external verifier.

Example 73 includes the subject matter of any of Examples 64-72, and further comprising means for performing a join protocol with a group leader to receive the group private key, wherein receiving the request for attestation comprises receiving the request for attestation in response to performing the join protocol.

Example 74 includes the subject matter of any of Examples 64-73, and wherein the group leader comprises a key management server.

Example 75 includes the subject matter of any of Examples 64-74, and wherein the group leader comprises a member of a subsystem other than the computing device, wherein the subsystem includes the computing device and the member.

Example 76 includes the subject matter of any of Examples 64-75, and further comprising: means for securely exchanging a symmetric session key with the second computing device in response to sending the attestation to the second computing device; and means for securely communicating with the second computing device using the symmetric session key.

Example 77 includes the subject matter of any of Examples 64-76, and further comprising: means for sending a second request for attestation to a third computing device, wherein the second request is indicative of a second interface; means for receiving a second attestation from the third computing device in response to sending the second request, wherein the second attestation is generated by the third computing device with a second group private key associated with the second interface; and means for verifying the second attestation with a second group public key that corresponds to the second group private key.

Example 78 includes a computing device for collective authorization, the computing device comprising: means for sending a request for attestation to a second computing device, wherein the request is indicative of an interface; means for receiving an attestation from the second computing device in response to sending the request, wherein the attestation is generated by the second computing device with a group private key associated with the interface; and means for verifying the attestation with a group public key that corresponds to the group private key.

Example 79 includes the subject matter of Example 78, and wherein the group private key is an enhanced privacy identifier (EPID) private key and the group public key is an EPID public key.

Example 80 includes the subject matter of any of Examples 78 and 79, and wherein the interface comprises an instance of an object model to be implemented by the second computing device.

Example 81 includes the subject matter of any of Examples 78-80, and wherein the interface comprises a membership of the second computing device in a subsystem, wherein the subsystem includes a plurality of computing devices.

Example 82 includes the subject matter of any of Examples 78-81, and wherein: the means for sending the request for attestation comprises means for sending the request for attestation via a multicast address, wherein the multicast address is synonymous with a group name of the group private key; and the means for receiving the attestation comprises means for receiving the attestation via the multicast address.

Example 83 includes the subject matter of any of Examples 78-82, and further comprising means for selecting a group certificate indicative of the group public key as a function of the group name of the multicast address.

Example 84 includes the subject matter of any of Examples 78-83, and wherein the second computing device comprises a member of a subsystem, wherein the subsystem includes the computing device and the second computing device.

Example 85 includes the subject matter of any of Examples 78-84, and wherein: the computing device comprises a member of a super-system, wherein the super-system includes a subsystem, and wherein the subsystem includes the second computing device; and the interface is exposed by the second computing device to the super-system.

Example 86 includes the subject matter of any of Examples 78-85, and further comprising: means for securely exchanging a symmetric session key with the second computing device in response to verifying the attestation; and means for securely communicating with the second computing device using the symmetric session key.

Example 87 includes the subject matter of any of Examples 78-86, and further comprising: means for receiving a second request for attestation to a second interface implemented by the computing device from a third computing device; means for selecting a second group private key for the second interface in response to receiving the second request for attestation, wherein the second group private key is associated with the second interface implemented by the computing device and is provisioned to the computing device; and means for sending, to the third computing device, a second attestation to the second interface using the second group private key in response to selecting the second group private key, wherein the second attestation is verifiable with a second group public key that corresponds to the second group private key.

Example 88 includes a computing device for credential provisioning, the computing device comprising: means for establishing a group public key associated with an interface, wherein the group public key is associated with a plurality of group private keys; and means for provisioning a plurality of component computing devices with the plurality of group private keys, wherein each component computing device implements the interface and is provisioned with a group private key of the plurality of group private keys.

Example 89 includes the subject matter of Example 88, and wherein the group public key is an enhanced privacy identifier (EPID) public key and each of the group private keys is an EPID private key.

Example 90 includes the subject matter of any of Examples 88 and 89, and wherein the means for provisioning the plurality of component computing devices comprises means for executing an EPID join protocol with each of the plurality of component computing devices.

Example 91 includes the subject matter of any of Examples 88-90, and wherein the interface comprises an instance of an object model implemented by each of the component computing devices.

Example 92 includes the subject matter of any of Examples 88-91, and wherein the interface comprises membership of each of the component computing devices in the subsystem.

Example 93 includes the subject matter of any of Examples 88-92, and further comprising means for integrating the plurality of component computing devices in the subsystem.

The invention claimed is:

1. A computing device for collective authorization, the computing device comprising:
a hardware processor;
one or more non-transitory, computer-readable storage media;
an attestation manager to receive a request for attestation to a first interface implemented by the computing device from a second computing device, wherein the request for attestation includes an identification of the first interface, wherein the first interface is at a first level in a hierarchy of interfaces implemented by the computing device, and wherein the first interface comprises a second interface at a second level in the hierarchy of interfaces, wherein the second level is lower than the first level; and
a key manager to select a group private key for the first interface at the first level in the hierarchy of interfaces from a plurality of group private keys based on the identification of the first interface in response to receipt of the request for attestation, wherein the group private key is associated with the first interface implemented by the computing device and is provisioned to the computing device, and wherein each group private key of the plurality of group private keys is associated with an interface of the hierarchy of interfaces implemented by the computing device;
wherein the attestation manager is further to send, to the second computing device, an attestation to the first interface based on the group private key in response to selection of the group private key, wherein the attestation is verifiable with a group public key that corresponds to the group private key.

2. The computing device of claim 1, wherein the group private key is an enhanced privacy identifier (EPID) private key and the group public key is an EPID public key.

3. The computing device of claim 1, wherein the first interface implemented by the computing device comprises an instance of an object model implemented by the computing device.

4. The computing device of claim 1, wherein the first interface implemented by the computing device comprises a membership of the computing device in a subsystem, wherein the subsystem includes a plurality of computing devices.

5. The computing device of claim 1, wherein:
to receive the request for attestation comprises to receive the request for attestation via a multicast address, wherein the multicast address is synonymous with a group name of the group private key;
to select the group private key comprises to select the group private key as a function of the group name of the multicast address; and
to send the attestation comprises to send the attestation via the multicast address.

6. The computing device of claim 1, wherein the key manager is further to perform a join protocol with a group leader to receive the group private key, wherein to receive the request for attestation comprises to receive the request for attestation in response to performance of the join protocol.

7. The computing device of claim 1, further comprising a symmetric key exchanger to:
securely exchange a symmetric session key with the second computing device in response to sending of the attestation to the second computing device; and
securely communicate with the second computing device using the symmetric session key.

8. The computing device of claim 1, further comprising a verification manager to:
send a second request for attestation to a third computing device, wherein the second request is indicative of a third interface;
receive a second attestation from the third computing device in response to sending of the second request, wherein the second attestation is generated by the third computing device with a second group private key associated with the third interface; and
verify the second attestation with a second group public key that corresponds to the second group private key.

9. One or more non-transitory, computer-readable storage media comprising a plurality of instructions that in response to being executed cause a computing device to:
receive a request for attestation to a first interface implemented by the computing device from a second computing device, wherein the request for attestation includes an identification of the first interface, wherein the first interface is at a first level in a hierarchy of interfaces implemented by the computing device, and wherein the first interface comprises a second interface at a second level in the hierarchy of interfaces, wherein the second level is lower than the first level;
select a group private key for the first interface at the first level in the hierarchy of interfaces from a plurality of group private keys based on the identification of the first interface in response to receiving the request for attestation, wherein the group private key is associated with the first interface implemented by the computing device and is provisioned to the computing device, and wherein each group private key of the plurality of group private keys is associated with an interface of the hierarchy of interfaces implemented by the computing device; and send, to the second computing device, an attestation to the first interface using the group private key in response to selecting the group private key, wherein the attestation is verifiable with a group public key that corresponds to the group private key.

10. The one or more non-transitory, computer-readable storage media of claim 9, wherein the first interface implemented by the computing device comprises an instance of an object model implemented by the computing device.

11. The one or more non-transitory, computer-readable storage media of claim 9, wherein the first interface implemented by the computing device comprises a membership of the computing device in a subsystem, wherein the subsystem includes a plurality of computing devices.

12. The one or more non-transitory, computer-readable storage media of claim 9, wherein:
   to receive the request for attestation comprises to receive the request for attestation via a multicast address, wherein the multicast address is synonymous with a group name of the group private key;
   to select the group private key comprises to select the group private key as a function of the group name of the multicast address; and
   to send the attestation comprises to send the attestation via the multicast address.

13. The one or more non-transitory, computer-readable storage media of claim 9, further comprising a plurality of instructions that in response to being executed cause the computing device to perform a join protocol with a group leader to receive the group private key, wherein to receive the request for attestation comprises to receive the request for attestation in response to performing the join protocol.

14. The one or more non-transitory, computer-readable storage media of claim 9, further comprising a plurality of instructions that in response to being executed cause the computing device to:
   securely exchange a symmetric session key with the second computing device in response to sending the attestation to the second computing device; and
   securely communicate with the second computing device using the symmetric session key.

15. The one or more non-transitory, computer-readable storage media of claim 9, further comprising a plurality of instructions that in response to being executed cause the computing device to:
   send a second request for attestation to a third computing device, wherein the second request is indicative of a third interface;
   receive a second attestation from the third computing device in response to sending the second request, wherein the second attestation is generated by the third computing device with a second group private key associated with the third interface; and
   verify the second attestation with a second group public key that corresponds to the second group private key.

16. A computing device for credential provisioning, the computing device comprising:
   a hardware processor;
   one or more non-transitory, computer-readable storage media;
   a key manager to establish a group public key associated with a first interface, wherein the group public key is associated with a plurality of group private keys, wherein the group public key is an enhanced privacy identifier (EPID) public key and each of the group private keys is an EPID private key; and
   a group manager to provision a plurality of component computing devices with the plurality of group private keys, wherein each component computing device implements the first interface and is provisioned with a group private key of the plurality of group private keys, wherein to provision the plurality of component computing devices comprises to execute an EPID join protocol with each of the plurality of component computing devices;
   wherein the key manager is further to establish a second group public key associated with a second interface, wherein the second group public key is associated with a second plurality of group private keys, wherein the second interface comprises the first interface; and
   wherein the key manager is further to provision a first component computing device of the plurality of component computing devices with a second group private key of the second plurality of group private keys, wherein the first component computing device implements the second interface and the first interface.

17. The computing device of claim 16, further comprising a system integrator to integrate the plurality of component computing devices in a subsystem, wherein the first interface comprises membership of each of the component computing devices in the subsystem.

18. One or more non-transitory, computer-readable storage media comprising a plurality of instructions that in response to being executed cause a computing device to:
   establish a group public key associated with a first interface, wherein the group public key is associated with a plurality of group private keys, wherein the group public key is an enhanced privacy identifier (EPID) public key and each of the group private keys is an EPID private key;
   provision a plurality of component computing devices with the plurality of group private keys, wherein each component computing device implements the interface and is provisioned with a group private key of the plurality of group private keys, wherein to provision the plurality of component computing devices comprises to execute an EPID join protocol with each of the plurality of component computing devices;
   establish a second group public key associated with a second interface, wherein the second group public key is associated with a second plurality of group private keys, wherein the second interface comprises the first interface; and
   provision a first component computing device of the plurality of component computing devices with a second group private key of the second plurality of group private keys, wherein the first component computing device implements the second interface and the first interface.

19. The one or more non-transitory, computer-readable storage media of claim 18, further comprising a plurality of instructions that in response to being executed cause the computing device to integrate the plurality of component computing devices in a subsystem, wherein the first interface comprises membership of each of the component computing devices in the subsystem.

* * * * *